(No Model.)
M. BROCK.
MACHINE FOR MAKING TACK STRIPS.
No. 402,058. Patented Apr. 23, 1889.
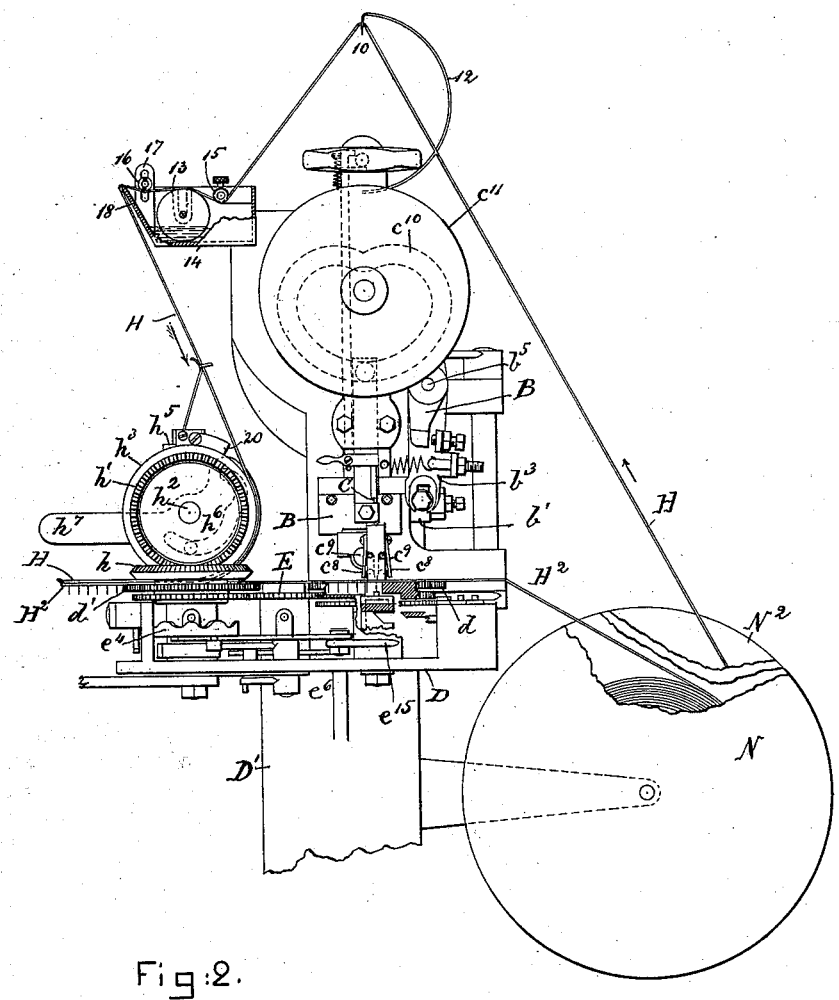
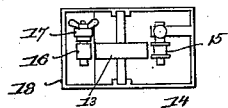
Witnesses.
Edgar A. Goddin.
John F. C. Prinkert.
Inventor.
Matthias Brock.
by Crosby & Gregory
attys

UNITED STATES PATENT OFFICE.

MATTHIAS BROCK, OF BOSTON, MASSACHUSETTS, ASSIGNOR TO THE McKAY & COPELAND LASTING MACHINE COMPANY, OF PORTLAND, MAINE.

MACHINE FOR MAKING TACK-STRIPS.

SPECIFICATION forming part of Letters Patent No. 402,058, dated April 23, 1889.

Application filed September 7, 1888. Serial No. 284,782. (No model.)

*To all whom it may concern:*

Be it known that I, MATTHIAS BROCK, of Boston, county of Suffolk, State of Massachusetts, have invented an Improvement in Machines for Making Tack-Strips for Lasting Boots or Shoes, of which the following description, in connection with the accompanying drawings, is a specification, like letters on the drawings representing like parts.

This invention has for its object to provide a machine for making tack-strips with means whereby paste or gum may be applied to unite the covering-strip and the foundation-strip, the covering-strip being pressed directly down, and to cover the heads of the nails after the same have been driven into the foundation-strip.

The invention herein described is an improvement on that described in United States Patent No. 247,143, dated September 13, 1881, to which reference may be had. In that patent the covering-strip was gummed at a very considerable expense and dried before it was applied in position upon the machine, and in which it was moistened; but by applying the gum in the machine to unite the two strips, as herein provided for, very great economy of time is effected, which also enables the cost of production of the tack-strip to be reduced.

Figure 1 is a front elevation of a sufficient portion of a tack-strip machine, such as referred to, with my improvements added to enable my invention to be understood, and Fig. 2 a top or plan view of the gumming mechanism detached.

The table D, supporting the tack-strip-feeding mechanism, the movable plate D', the feed-wheels $d\ d'$, the intermediate gear, E, the disk $e^6$, the lever $e^{15}$, the cam $e^4$, the sliding plate B, the carriage $b'$, the lever $b^3$, pivot $b^5$, lever B', to move the carriage $b'$, the driver-bar having the attached driver C, the jaws $e^8$, (shown by dotted lines,) the spring $c^9$ to close them, the roll N, carrying the foundation-strip of paper, the dish $c^{11}$, having the cam-groove $c^{10}$ to reciprocate the driving-gear, the bevel-gear $h$, the bevel-gear $h'$, driven by it, the lever $h^7$, pivoted near its upper end and slotted as at $h^6$, as shown by dotted lines, the presser-wheel $h^3$ and standard $h^5$, are all as in the said patent, wherein like letters are designated by like parts, and herein in operation the parts referred to will be operated as described and by means as described in the said patent.

In accordance with my invention, I have applied, as herein shown, immediately alongside of the roll N a second roll, $N^2$, upon which is wound the covering-strip H, the said covering-strip being led upwardly over a suitable guide, as 10, preferably formed by bending the end of a spring, 12, connected to a rigid part of the frame-work, the said covering-strip being led from the guide 10 against a pasting-roll, 13, in a suitable paste or gum tank, 14, the said strip passing on its way under a roll, as 15, and beyond the pasting or gumming roll 13 under a roll, 16, which is made adjustable on a standard, 17, so that the roll 16 may act to bend the strip more or less about the top of the rear edge, 18, of the paste or gum box, and thus scrape off more or less of the gum applied to the under side of the strip by the roll 13, the gummed strip then passing down over a guide, which keeps the strip at proper tension, the strip then coming against the periphery of the roll $h^3$ and down to and against the heads of the tacks and the upper side of the foundation-strip $H^2$, the gummed strip being forced directly against the said foundation-strip by the action of the said roll $h^3$ upon the upper side of the covering-strip.

The surface of the roll $h^3$ is kept clean and substantially dry by means of a wiper, as 20, composed, preferably, of a piece of felt applied to a spring fastened to the standard $h^5$.

I do not desire to limit my invention to the particular construction of the pasting or gumming device, as the same may be variously modified without departing from my invention, and so, also, I desire to state that instead of the particular devices shown for feeding and setting the tacks in the foundation-strip I may employ any other well-known form of tack-setting mechanism.

Prior to my invention I am not aware that a machine for setting tacks in a strip has ever been provided with means to apply between the two strips paste or gum by which to cause them to adhere.

I claim—

In a machine for making tack-strips substantially such as described, the combination, with means for supporting and feeding a foundation-strip, and a tack-driver, of pasting or gumming mechanism by which to apply paste to unite the covering-strip to the foundation-strip, and with a presser to press the covering-strip to the foundation-strip after the same has been provided with tacks, thus securing the covering and foundation strips together, substantially as described.

In testimony whereof I have signed my name to this specification in the presence of two subscribing witnesses.

MATTHIAS BROCK.

Witnesses:
G. W. GREGORY,
B. DEWAR.